CRYSTAL OSCILLATOR OF HIGH STABILITY

Filed July 1, 1966

Guntis Brunins,
INVENTOR.
BY Harry M. Saragovitz
Edward J. Kelly
Herbert Berl
Aubrey J. Dunn 3,366,893
CRYSTAL OSCILLATOR OF HIGH STABILITY
Guntis Brunins, Hyattsville, Md., assignor, by mesne assignments, to the United States of America as represented by the Secretary of the Army
Filed July 1, 1966, Ser. No. 563,639
4 Claims. (Cl. 331—116)

ABSTRACT OF THE DISCLOSURE

A crystal controlled electronic oscillator which employs a special feedback loop to improve short-term stability of the oscillator. In particular, the feedback loop includes a frequency-sensitive crystal filter.

The ability to accurately determine the passage of time from period to period and continuously is a capability of great importance and value. Every electrical receiving and transmitting system uses a reference frequency or clock. For example, every phase coherent radar requires a stable frequency reference, and the requirements on stability are becoming more severe every day. In a phase coherent radar, it is required that phase of a target return be compared with the phase of the signal transmitted a few milliseconds earlier. A stable reference signal is used for this purpose. It can be seen, therefore, that for accurate interpretation of a target return, the frequency of the reference signal must be accurately maintained at least for a short time interval which represents the maximum range at which a target could be detected, using a particular transmitted signal frequency.

An object of the invention is to provide a crystal oscillator of high stability.

Another object is to provide a crystal oscillator of high stability which is relatively simple in construction.

These objects and others which may be obvious from the following description may be accomplished by the invention as shown in the drawings, in which.

The typical oscillator is a tuned amplifier employing regenerative feedback. Specifically, the phase angle of this feedback is such that it is in phase with the starting power for the amplifier. Since a single stage amplifier, such as a common emitter type, has a 180° phase shift between the input and output thereof, it is necessary to cause an additional 180° phase shift in the feedback to have the feedback in phase with the starting power. This is accomplished by many known methods, such as the use of a transformer, etc. If the feedback varies from the proper phase angle, oscillation cannot be sustained. This last sentence is made the basis of many oscillator control circuits where it is desired to maintain a certain frequency. If some means is provided in the feedback path that provides varying phase shift for varying frequencies, and if the ratio of this phase shift to frequency variations is high (large equivalent Q), an oscillator can be made which will oscillate only at or very near a desired frequency. This is the basis of the invention.

The invention is a crystal oscillator that has, in the feedback path thereof, a crystal filter in which the crystal is so selected that small variations from the desired frequency of oscillation cause large variations in the feedback phase angle. The filter of the invention ordinarily causes a −90° phase shift in the feedback signal, or acts as a capacitor. The tuned circuit of the oscillator, including the crystal therein, acts as a second filter, and the crystal thereof is so chosen that it acts as an inductor or imparts a +90° phase shift to the feedback signal at the desired frequency. Obviously, the +90° and −90° cancel each other and give a 0° phase shift in the feedback loop. Any deviations from the frequency determined by the two crystals cause a large deviation in the feedback phase angle, and tends to prevent frequency drifting, or in other words, provides good frequency stability for the oscillator.

Figure 1:
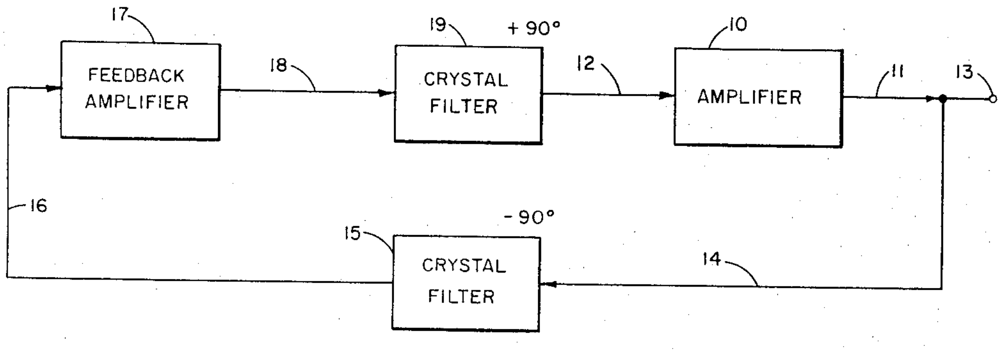
FIGURE 1 shows a block diagram of the invention.

Referring now to the block diagram of FIGURE 1, numeral 10 designates an amplifier having an even number of amplifying stages such that the total phase shift between the input and output thereof is 0° or 360° or some multiple of 360°. The output of amplifier 10 is designated 11, and the input thereto is 12. Connected to output 11 of 10 is a load terminal 13 and a feedback path 14. A portion of the power from 11 is fed back through path 14 to a crystal filter 15. The output of 15 is fed through a path 16 to an amplifier 17 which has an even number of stages in order to have a 0° or a 360° (or multiple of 360°) phase shift therethrough. The output of amplifier 17 is fed through a path 18 to another crystal filter designated 19. The output of filter 19 is then fed to input 12 of amplifier 10. The crystal filter 19 is the tuned crystal circuit ordinarily employed in a crystal controlled oscillator. Crystal filter 15 provides a 90° lag network (capacitive reactance) by employing a crystal cut so that its parallel resonant frequency is slightly below the desired frequency of oscillation. The crystal in filter 19 is chosen so that the desired frequency of oscillation is slightly below the parallel resonant frequency of the crystal, or between the parallel and series resonant modes of said crystal and, consequently, provides a leading +90° (inductive reactance) to the feedback signals. Thus, it can be seen that any small variations from the desired frequency of oscillation, either more or less than the desired frequency, will result in a large amount of phase shift in the feedback loop, or the oscillator will have good frequency stability better than that of a single crystal oscillator. Also, operation near the parallel modes allows use of adequate voltage levels on the crystals to maintain excellent signal-to-noise ratio, without exceeding the power dissipation limits of the crystals.

Figure 2:
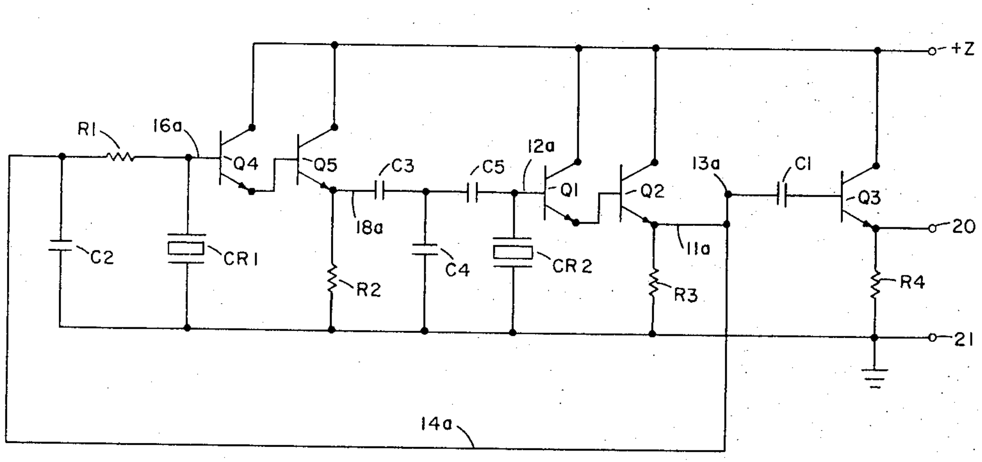
FIGURE 2 shows an exemplary specific embodiment of the invention.

A specific example of a circuit which may practice the invention is shown in FIGURE 2, employing transistors.

Referring now to FIGURE 2, there is shown two transistors, Q1 and Q2, which form a two stage amplifier, which amplifier is the equivalent of amplifier 10 of FIGURE 1. Like numerals are used in FIGURE 2 for equivalent parts from FIGURE 1, but with the suffix "*a*" added in each case. Thus, output **11*a* of FIGURE 2 is equivalent to output 11 of FIGURE 1. Also, terminal 13*a* corresponds to terminal 13 of FIGURE 1, and feedback path 14*a* corresponds to 14 of FIGURE 1. The output of Q2 is fed from terminal 13*a* through coupling capacitor C1 to output transistor Q3, and points 20 and 21 provide output terminals to a load. Feedback path 14*a* connects to a filter circuit including resistor R1, capacitor C2, and crystal CR1. This filter circuit is connected through path 16*a* to a two stage amplifier including transistors Q4 and Q5, which amplifier provides isolation, power gain and 0° phase shift between input and output. The output of this amplifier is connected through path 18*a* and coupling capacitor C3 to another crystal filter including capacitors C4, C5, and crystal CR2. This crystal filter is, in turn, connected to transistor Q1 through path 12*a*. Resistors R2, R3, and R4 are the ordinary load resistors for the various transistors, and power for the transistors is provided through a terminal +Z. The crystal filter including crystal CR2 is the equivalent of filter 19** of FIGURE 1, and the crystal filter including crystal CR1 is the equivalent of filter 15 of FIGURE 1.

While a specific circuit employing transistors has been shown, it would be obvious to one skilled in the art that a vacuum tube type of circuit could equally well practice the invention, as could a circuit employing other types of active circuit elements, including other types of semiconductor devices. Also, the two crystal resonators may use a common crystal blank. In general, the cascading technique may be employed to improve the performance of oscillator circuits using relatively low-Q resonators, such as ceramic, magnetostrictive, or other elements.

I claim:

1. A crystal controlled oscillator having filter means in the feedback path of the oscillator, and including an amplifier having a tuned circuit connected to the input of said amplifier, and whereby a portion of the output of said amplifier provides a feedback signal to said feedback path, said tuned circuit includes a first crystal, said filter means includes a second crystal, said amplifier comprises first and second transistor amplifying stages, and said feedback path includes third and fourth transistor amplifying stages.

2. The oscillator of claim 1 wherein said tuned circuit also includes first and second capacitors, with said first crystal acting as an inductor.

3. The oscillator of claim 2 wherein said filter means includes a resistor and a capacitor, and wherein said crystal acts as a capacitor.

4. A crystal controlled oscillator comprising: a first two-stage transistor amplifier having an input and an output and including a first tuned circuit having a first crystal connected to the input of said first amplifier, a feedback path being connected from the output of said first amplifier to the input of said first amplifier, said feedback path including a second two-stage transistor amplifier having an input and an output and including a second tuned circuit with a second crystal connected to the input of said second amplifier, and with said output of said second amplifier connected to said first tuned circuit.

References Cited

UNITED STATES PATENTS

| | | | |
|---|---|---|---|
| 1,864,368 | 6/1932 | Nicolson ---------- | 331—162 |
| 3,278,862 | 10/1966 | Danzer ------------ | 331—116 |

OTHER REFERENCES

H. R. Newhoff: "Crystal Controlled Multivibrator," Electronics, Apr. 12, 1963; pp. 60–61.

ROY LAKE, *Primary Examiner.*

S. H. GRIMM, *Assistant Examiner.*